April 18, 1933.  R. H. WAPPLER  1,904,587
TEMPERATURE CONTROLLING APPARATUS
Filed Aug. 2, 1930
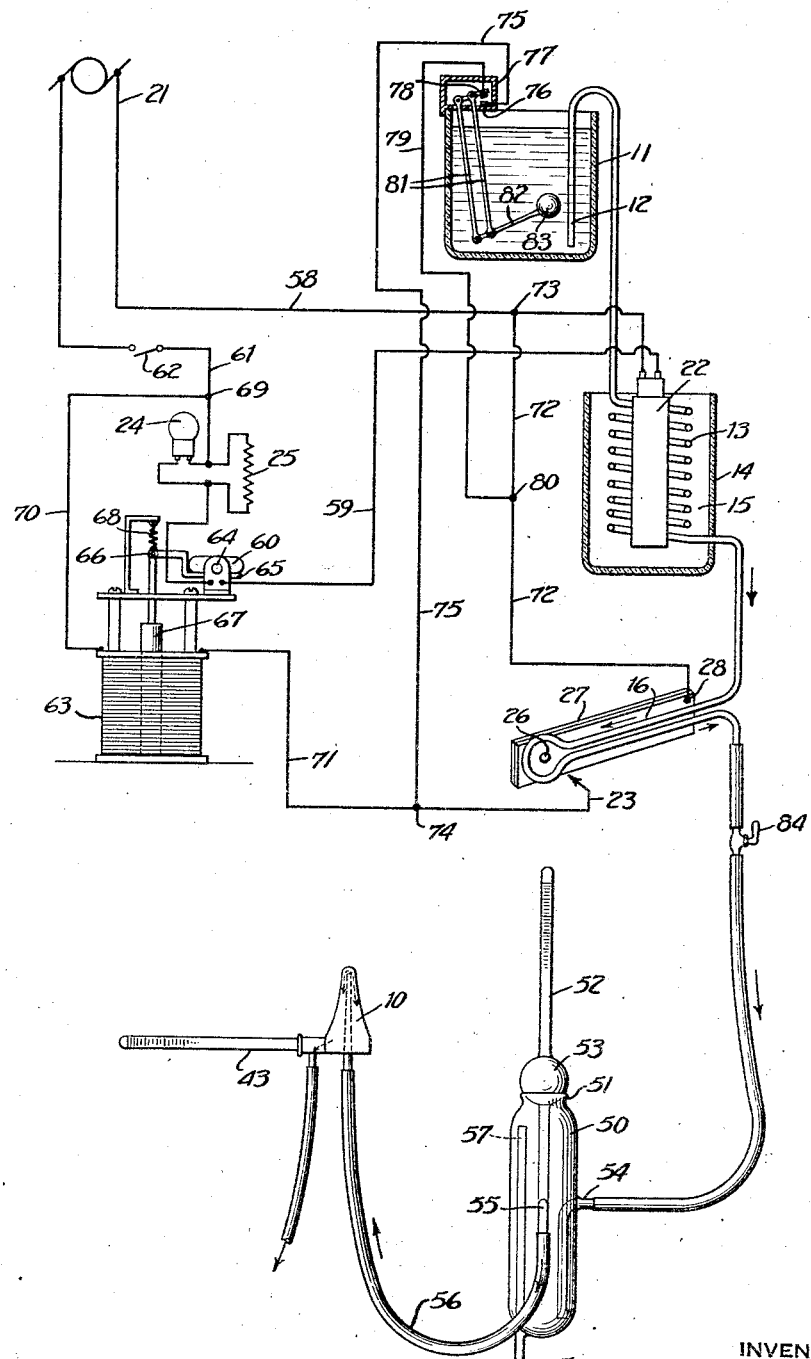
INVENTOR
Reinhold H. Wappler
BY
ATTORNEY Patented Apr. 18, 1933

1,904,587

UNITED STATES PATENT OFFICE

REINHOLD H. WAPPLER, OF YONKERS, NEW YORK

TEMPERATURE CONTROLLING APPARATUS

Application filed August 2, 1930. Serial No. 472,738.

My present invention relates generally to temperature-controlling apparatus, and has particular reference to the accurate control of the temperature of a flowing liquid such as water.

The invention described and claimed herein constitutes an improvement of the invention disclosed by me in my earlier-filed application Serial No. 402,581.

As pointed out in my said earlier application, one of the main uses to which the present type of apparatus can be applied lies in diathermic treatment of portions of the human body. Although my invention is by no means limited to a specific application of this character, as will be readily understood, I have shown a diathermic apparatus by way of illustration in my earlier application, and I shall illustrate my present improvement in a similar manner, viz., as applied to a diathermic apparatus.

Briefly, and in a general way, my invention relates to an apparatus wherein a liquid such as water is caused to flow continuously through a conduit and through an applicator or the like in series with the conduit, and wherein I have provided mechanism and means for accurately maintaining the temperature of the liquid at a predetermined constant level. Thus, my invention may be advantageously employed as a diathermic apparatus for eradicating germs, especially in cases where the temperature at which the germs are destroyed is closely below the temperature at which human tissues are impaired. For example, certain venereal germs or cocci which cannot stand a heat in excess of 108° F. may be eradicated with certainty by maintaining an applicator at a temperature of, say, 120° F., and this will not affect the human tissues, which are capable of withstanding heat up to about 140° F.

It is a general object of my present invention to provide an improved apparatus for automatically maintaining the temperature of a liquid accurately constant over prolonged periods of time, and, in fact, my present apparatus is capable of maintaining the temperature of flowing water, for example, within a half degree of accuracy for periods as long as an hour or more.

Where I employ a hollow applicator for the flowing liquid I provide a conduit which extends from a liquid supply tank successively to an electric heating unit, to a thermostat, and thence to the applicator. The main features and advantages of my present apparatus are the same as those which are set forth in full in my co-pending application, but in many respects, my present improved apparatus is of a more efficient and satisfactory character, insuring safe, reliable, and fool-proof operation, and requiring a minimum of attendance and manipulations on the part of the operator.

One of the main features of my present improved apparatus lies in the provision of a temperature-leveling chamber or equalizing tank which is so constructed and arranged as to enhance the accuracy with which the temperature of the flowing liquid is accurately maintained at a predetermined amount. Another feature lies in providing an over-flow arrangement whereby the liquid may be permitted to flow continuously past the heating unit and the thermostatic device, regardless of its passage to or through an applicator or the like. In this way, interrupted operation, so far as the applicator is concerned, will not affect an accurate maintenance of the desired temperature.

It is another feature of my present improved apparatus to provide a simplified automatic mechanism for breaking the electric circuit of the heating unit whenever the liquid supply fails.

Other features of my invention reside in the novel construction and arrangement of parts which render my entire device extremely simple and compact, inexpensive to manufacture, staunch, and simple and reliable to utilize.

I achieve the foregoing objects, and such other objects as may hereinafter appear or be pointed out, in the manner illustratively exemplified in the accompanying drawing, in which—

The figure is a diagrammatic view showing the various parts of my present apparatus in their relationships to one another, and fully illustrating the general nature of my invention.

Referring to the figure, which is similar in nature to Figure 6 of my co-pending application, I have illustratively shown a hollow applicator 10 which may be of any desired shape, size, or material. In the embodiment herein illustrated by way of example, this applicator is adapted to be applied into a body cavity for the purpose of an internal application of an accurately maintained heat.

The applicator 10 is adapted to permit the passage of liquid therethrough, and is arranged in series with a conduit which extends from a supply tank 11 to a drain or discharge receptacle (not illustrated).

Before describing the details of my apparatus, I will premise that all the parts may be suitably mounted upon a framework, pedestal, or structure of any desired character, the same having no direct bearing upon the features of my invention except for the obvious necessity that the supply tank 11 be positioned at a relatively high point while the drainage is provided for at a relatively low location.

The tank 11 is preferably of glass, and has a capacity of approximately one gallon. The free end 12 of the conduit is positioned at the bottom of the tank 11 and extends upwardly around the upper edge so as to effect a siphoning of the liquid in the tank. The siphoning of the liquid is of importance in connection with the other features of my apparatus, and provides for a uniformity of flow not otherwise achievable.

The conduit extends downwardly to a coil portion 13 which is preferably immersed in a suitable heating tank 14 adapted to contain a heat-conducting medium 15 such as water. From here, the conduit extends immediately and through the shortest possible route to the U-shaped or doubled-back portion 16 which is of heat-conductive material such as metal and which is associated with the thermostat. The conduit then extends to the bottom of the temperature-leveling chamber or equalizing tank 50 which "irons out" slight irregularities in temperature.

I have shown the tank 50 constructed of glass and having an open upper end 51. It is advantageous to accommodate a thermometer within the end 51, and I have illustratively shown a thermometer 52 provided with an enlarged portion 53 adapted to rest within the top open end of the chamber 50.

The chamber 50 is provided with an inlet opening 54 which preferably extends to the bottom of the chamber so that the liquid will enter the chamber at the bottom and flow upwardly. At 55 I have shown an outlet opening, and the conduit portion 56 connects this outlet opening 55 with the inlet of the applicator 10.

The chamber 50 is also provided with an over-flow pipe or opening 57 which functions whenever the flow of liquid through the conduit portion 56 is impeded for any reason. More particularly, such an interruption of the flow will not in the least affect the flow in the conduit at the points preceding the chamber 50, since the liquid will simply flow upwardly through the chamber 50 and out through the over-flow pipe 57 to the drain.

The electrical circuits may be traced from the main source of supply 21. The main circuit extends via a lead 58 to and through the electric heating unit 22 which is immersed in the chamber 14 along with the coil 13. From the heating unit 22 a lead 59 extends to an electric switch 60, thence to an indicating lamp 24, and back through a lead 61 to the power supply 21. The lamp 24 may or may not be employed, as desired, but when it is used, a shunt resistance 25 is preferably placed in parallel therewith. I have shown a main switch 62 interposed in the lead 61.

In accordance with my present invention, the thermostat controls the opening and closing of the switch 60 through the intermediary of a mechanism which I have illustratively shown in the form of an electromagnetic device. More particularly, it is to be noted that I have shown a solenoid 63, and this type of device is of particular advantage when the switch 60 is in the form of a mercury switch. Thus, I have shown the switch 60 as a mercury switch pivoted at 64. In the construction illustrated, the support 65 for the switch is articulated at 66 to the upper end of the solenoid core 67. A spring 68 tends normally to hold this core upwardly, but when the solenoid 63 is energized, the core 67 is drawn downwardly against the action of the spring 68 and tips the switch 60 so as to open the latter and break the circuit of the heating unit 22.

The mechanism illustratively exemplified by the solenoid 63 and the thermostat are arranged in series in a circuit which is in parallel to the original or main circuit hereinbefore described. Thus, it is to be noted that from the point 69 in the lead 61 a connection 70 is made with one terminal of the solenoid 63. From the other terminal of the solenoid, a lead 71 extends to the fixed terminal 23 of the thermostat. This fixed terminal is normally out of contact with the terminal 26 of the thermostat, the latter being mounted upon the bi-metallic conductive strip 27. From this strip, as at 28, a lead 72 extends to the lead 58 and connects therewith at the point 73. This completes the parallel circuit previously referred to.

It will be understood that the terminal 23 of the thermostat, hereinbefore referred to as a "fixed" terminal, is actually adjustable by extremely small amounts so as to cause the thermostat to function at different desired temperatures. This control is preferably accomplished in the same manner as illustrated in my co-pending application, viz., by a manually controllable knob or the like suitably mounted in association with the terminal 23 so as to move it closer to, or further from, its complementary terminal 26.

Before describing the operation of my apparatus, I will refer to a third electric circuit which is arranged in parallel with the thermostat. From the point 74 in the lead 71 a lead 75 extends to a contact 76, preferably mounted in a chamber 77 at the top of the tank 11. The contact 76 is adapted to cooperate with a complementary contact 78 which is connected by a lead 79 to the lead 72 at the point 80. In the illustrated embodiment, the contact 78 is movable and is articulated to the levers 81 forming part of a float mechanism. The lower ends of the levers 81 are articulated to an arm 82 which carries the float 83 immersed within the liquid in the tank 11.

When the apparatus is used, the operator first adjusts the terminal 23 to the temperature which he desires to maintain at the applicator 10. By means of a suitably calibrated dial or the like he may, for example, set this terminal so that the temperature of the liquid will be maintained at, say, 120° F. He then closes the main switch 62 and opens the petcock 84 in the conduit. The closure of the switch 62 will cause current to flow through the switch 60 and through the heating unit 22. The lamp 24 will light to indicate this flow of current through the heating unit. The heat from this unit will be transmitted through the medium 15 to the liquid in the coil 13, and this heat will in turn be transmitted from the U-shaped heat-conductive portion 16 of the conduit to the bi-metallic strip 27.

When the predetermined and desired temperature has been reached, the bi-metallic strip 27 will have deflected sufficiently to bring the contact 26 up to the contact 23, and this will close the parallel circuit which passes through the solenoid 63. The solenoid, being thus energized, will draw the core 67 downwardly and will tip the switch 60 to open the latter. This will discontinue a flow of current through the heating unit 22 and will extinguish the lamp 24 to indicate this discontinuance.

As soon as the liquid tends to drop below this desired temperature, the contacts 23 and 26 again break, thus deenergizing the solenoid 63 and permitting the spring 68 again to close the switch 60. In this way, the temperature of the liquid flowing in the conduit will be maintained accurately at the desired amount.

Under normal conditions, with a supply of liquid in the tank 11, the foregoing operation will continue indefinitely; but when the supply of liquid in the tank 11 falls below a predetermined amount, the float 83 will drop and will ultimately close the contacts 76 and 78. This has the same effect as though the contacts 26 and 23 were closed, serving to complete the parallel circuit through the solenoid, thereby energizing the latter and opening the switch 60. In this way, a failure of liquid will automatically result in a discontinuance of the current in the heating unit 22.

Under ordinary conditions, the liquid flows through the applicator 10 and out to the drain; but if, for any reason, the flow is impeded through the applicator (as by means of a purposefully arranged petcock or the like), the flow will nevertheless continue past the heating unit 22 and the thermostat. Under such conditions, the liquid will flow into the inlet opening 54 of the chamber 50, and instead of passing out of the outlet opening 55 it will pass out through the overflow 57. Accordingly, during an interruption at the applicator the liquid is nevertheless permitted to continue its flow, and the desired temperature is thus continuously maintained.

It will be understood that the construction of the thermostat is substantially the same as that disclosed in my earlier-filed application, and for this reason I do not deem it necessary to describe the same in detail at this time. Nor have I illustrated the manner in which the thermostat and the other parts of the apparatus are mounted with respect to a supporting structure or the like.

The advantageous characteristics of my present apparatus, particularly with respect to the novel type of thermostat I have provided, are more fully set forth in my co-pending application. Every drop of liquid passing through the system contributes to the operation of the thermostat, and slight inaccuracies of temperature, due to making and breaking of the circuit at the thermostat, are effectively ironed out in the chamber 50, so that an accurately uniform temperature will be recorded on the thermometer 43. The applicator 10 will, therefore, safely and with certainty supply exactly the desired amount of heat, and this may be maintained indefinitely by simply keeping the tank 11 filled with liquid.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In an apparatus of the character described, a liquid supply tank, a heating unit, an electric circuit for said unit, a thermostat in said circuit and including a bimetallic temperature-responsive strip, a hollow applicator, a conduit extending from said tank successively to said heating unit, said thermostat, and said applicator, said conduit having a conductive portion mounted on said strip, and an enlarged temperature-leveling chamber in series with said conduit between the thermostat and the applicator, said chamber having an overflow outlet, whereby the liquid may be permitted to flow continuously past the heating unit and thermostat regardless of its flow through the applicator.

2. In an apparatus of the character described, a liquid supply tank, a heating unit, an electric circuit for said unit, a switch in said circuit, a thermostat controlling the opening and closing of said switch and including a bimetallic temperature-responsive strip, a hollow applicator, a conduit extending from said tank to said heating unit and thermostat and thence to said applicator, said conduit having a conductive portion mounted on said strip, and an enlarged temperature-leveling chamber in series with said conduit between the heating unit and the applicator.

3. In an apparatus of the character described, a liquid supply tank, a heating tank containing a heat-conducting medium, a heating unit in said heating tank, an electric circuit for said unit, a thermostat in said circuit and including a bimetallic, temperature-responsive strip, a conduit extending from said supply tank to said applicator and having a coiled portion immersed in said heating tank and a heat-conductive, doubled-back portion mounted on said bimetallic strip, and an enlarged, temperature-leveling chamber in series with said conduit between the coiled portion and the applicator.

4. In an apparatus of the character described, a liquid supply tank, a heating tank containing a heat-conducting medium, a heating unit in said heating tank, an electric circuit for said unit, a switch in said circuit, a solenoid for controlling the opening and closing of said switch, a thermostat controlling the operation of said solenoid and including a bimetallic, temperature-responsive strip, and a conduit extending from said supply tank to said applicator and having a coiled portion immersed in said heating tank and a heat-conductive, doubled back portion mounted on said bimetallic strip.

5. In an apparatus of the character described, a liquid supply tank, a heating tank containing a heat-conducting medium, a heating unit in said heating tank, an electric circuit for said unit, a switch in said circuit, a thermostat controlling the opening and closing of said switch and including a bimetallic, temperature-responsive strip, a conduit extending from said supply tank to said applicator and having a coiled portion immersed in said heating tank and a heat-conductive, doubled-back portion mounted on said bimetallic strip, and means independent of said thermostat for automatically operating said switch to break said electric circuit whenever the supply tank has emptied by a predetermined amount.

In witness whereof I have signed this specification this 30 day of July, 1930.

REINHOLD H. WAPPLER.